J. E. MARSHALL.
INCLINOMETER.
APPLICATION FILED AUG. 29, 1917.
1,260,565.
Patented Mar. 26, 1918.
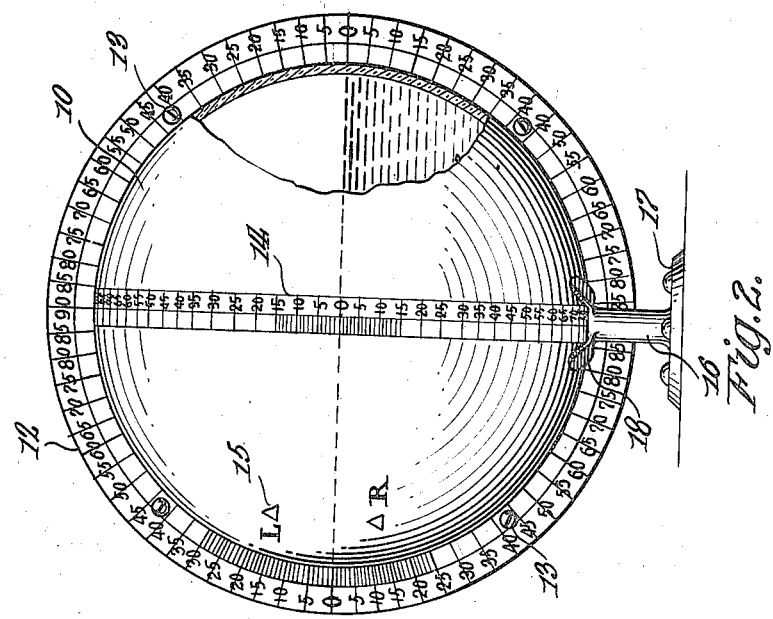
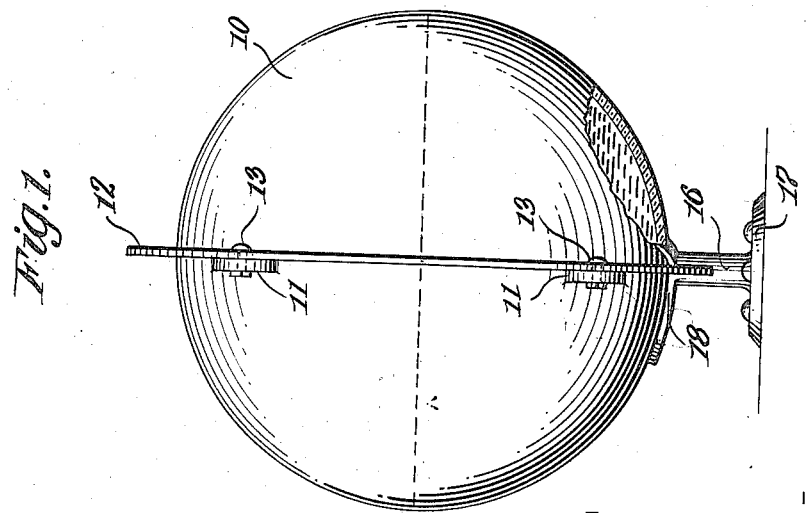
INVENTOR
James E. Marshall
WITNESSES
Guy M. Spring
Wm Zeaman
BY Richard B. Owen,
ATTORNEY

UNITED STATES PATENT OFFICE.

JAMES E. MARSHALL, OF CANEY, KANSAS.

INCLINOMETER.

1,260,565.   Specification of Letters Patent.   Patented Mar. 26, 1918.

Application filed August 29, 1917. Serial No. 188,857.

*To all whom it may concern:*

Be it known that I, JAMES E. MARSHALL, a citizen of the United States, residing at Caney, in the county of Montgomery and State of Kansas, have invented certain new and useful Improvements in Inclinometers, of which the following is a specification.

This invention has relation to levels, and has for an object to provide a device intended primarily for use upon aeroplanes, airships or the like to indicate the degree of inclination thereof in any direction relative to the normal level of the ground.

Another object of the invention is to provide a device of this character in the nature of a hollow sphere of transparent material containing liquid, with graduated dials surrounding the instrument whereby the degree of inclination of the aeroplane, airship or the like may be determined by noting the graduations coincident with the surface of the liquid therewithin.

In addition to the foregoing my invention comprehends improvements in the details of construction and arrangement of the parts to be hereinafter more fully described and particularly set forth in the appended claim.

In the accompanying drawings in which similar and corresponding parts are designated by the same characters of reference throughout the several views in which they appear:

Figure 1, is a view in side elevation with parts broken away of a level constructed in accordance with my invention, and Fig. 2, is a view thereof in front elevation.

With reference to the drawings 10 indicates a hollow spherical container of glass, or other transparent material, formed integrally upon its outer surface with apertured lugs 11, all of which lie in the same diametrical plane. An annular dial plate 12 is encircled about the container, and is secured to the lugs 11 by means of bolts 13 in a manner to dispose the dial plate in a plane coincident with a vertical diametrical plane of the globe or container. A series of graduations 14, are then etched upon the surface of the globe, said graduations lying in a plane which coincides with a vertical diametrical plane through the container, the plane of said graduations being however, disposed at exactly right angles to the plane of the graduated dial 12. The graduations 14, and the graduations on the dial plate 12 begin on a horizontal plane passing diametrically through the container and extend both upward and downward to the zenith of the globe and to a plumb line from the center, the graduations running from zero to 90°. The surface of the globe is also etched at points adjacent the dial 12, above and below the horizontal diametrical plane with symbols 15 lettered "L" and "R," as shown in Fig. 2.

The device is supported upon a standard 16 having its lower end flared out as at 17 to provide a base whereby the standard may be securely fastened to a stationary portion of the aeroplane, the upper end of the standard being formed with diverging supports 18 upon which the globe is rested. The globe may be secured to the arms 18 by cement or any other suitable means. The globe is however supported upon its support in a manner to dispose the dial plate 12 in a vertical plane as indicated in Fig. 1.

The globe, during the manufacture thereof is filled exactly half full with some liquid, such as alcohol, preferably a fluid which will not freeze in low temperatures. If desirable the fluid may be colored.

In use the instrument is installed upon the aeroplane, airship or the like so that when the machine is level, the level of the liquid within the globe will coincide, along the edges thereof, with the zero graduations of both the series of graduations 14 and those of the dial plate 12. Obviously, in flight, the degree of inclination in a forward or rearward direction of a machine, will be indicated by observing the coincidence of the level of the fluid within the globe upon any of the graduations of the series 14. Conversely, an inclination of the machine, either to the right or to the left, laterally, will be indicated by observing the graduation on the dial plate 12 coincident with the level of the liquid. The exact extent of the inclination in either direction will also be indicated to a certainty by the graduations. If the machine is kept in a direction both forwardly or rearwardly and laterally the degree of inclination will be registered on both series of graduations to the same extent thereby indicating to the driver that the machine is inclined in this manner.

Thus it will be seen that I have provided an instrument which will indicate to the driver at all times any variation of his machine from a plane parallel to the normal surface of the ground and the exact extent of the inclination. It will also be seen that if the level of the liquid approaches one of the symbols 15, the fact that the machine is inclined laterally either to the right or the left will be indicated by the letter, L or R adjacent said symbol. It is a well known fact that when aeroplanes are surrounded by clouds or mist during flight, the operator is frequently unaware whether or not he is traveling right side up or upside down. This device will indicate this fact inasmuch as the liquid will then be contained in what the driver regards as the upper portion of the globe if the machine is inverted. To increase the fluency of the liquid within the globe the globe may be partially or completely exhausted of air. Obviously, the device is also applicable for use on submarine boats to indicate both longitudinal and lateral variations thereof from a horizontal position.

While I have illustrated and described my invention with some degree of particularity, I realize that in practice various alterations thereover may be made, and I therefore desire to reserve the right and privilege of changing the form of the details of construction, or otherwise altering the arrangement of the correlative parts without departing from the spirit of the invention, or the scope of the appended claim.

Having thus described my invention, what I claim as new and desire to secure by Letters Patent is:

A device of the character described for aeroplanes or the like and including a transparent fluid containing spherical element having a circular series of graduations inscribed thereon, said graduations all lying in a diametrical plane, lugs apertured and integrally formed on the outer surface of the globe, said lugs being located in a diametrical plane at substantially right angles to the plane of the graduations, an annular dial plate surrounding the spherical element, means for securing said plate to the lugs, and a support for the spherical element.

In testimony whereof I affix my signature in presence of two witnesses.

JAMES E. MARSHALL.

Witnesses:
 RICHARD B. OWEN,
 M. E. JONES.